(12) United States Patent
Lin

(10) Patent No.: US 6,201,614 B1
(45) Date of Patent: Mar. 13, 2001

(54) DITHERED IMAGE COMPRESSION SYSTEM

(75) Inventor: Frederick Lin, Northridge, CA (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

(21) Appl. No.: 09/220,324

(22) Filed: Dec. 24, 1998

(51) Int. Cl.⁷ .......... H04N 1/405; H04N 1/411; H04N 1/413; G06T 9/00

(52) U.S. Cl. .......... 358/1.9; 358/1.16; 358/457; 358/429; 382/237; 382/244; 382/270

(58) Field of Search ............. 358/1.9, 1.15, 358/1.16, 404, 429, 426, 444, 456, 457, 460, 298, 466; 382/237, 239, 244, 251, 232, 270

(56) References Cited

U.S. PATENT DOCUMENTS

| | | |
|---|---|---|
| 4,193,096 | 3/1980 | Stoffel . |
| 4,281,312 | 7/1981 | Knudson . |
| 4,760,460 | 7/1988 | Shimotohno . |
| 5,323,247 | 6/1994 | Parker et al. .......... 358/456 |
| 5,359,430 | 10/1994 | Zhang .......... 358/455 |
| 5,457,772 | 10/1995 | Shannon . |
| 5,463,703 * | 10/1995 | Lin .......... 382/251 |
| 5,542,031 | 7/1996 | Douglass et al. . |
| 5,548,689 | 8/1996 | Poppenga et al. . |
| 5,552,898 | 9/1996 | Deschuytere .......... 358/426 |
| 5,682,442 | 10/1997 | Johnston et al. .......... 382/239 |
| 5,708,518 | 1/1998 | Parker et al. .......... 358/534 |
| 5,917,952 * | 6/1999 | Noh .......... 382/239 |
| 6,137,589 * | 10/2000 | Obrador et al. .......... 358/1.16 |

FOREIGN PATENT DOCUMENTS

| | | | |
|---|---|---|---|
| 3501830 | 1/1984 | (DE) | H04N/1/413 |
| 278 548B1 | 5/1993 | (EP) | H04N/1/41 |

\* cited by examiner

*Primary Examiner*—Scott Rogers
(74) *Attorney, Agent, or Firm*—Michael A. Glenn

(57) ABSTRACT

A dithered image compression system that converts a source image into an image that is efficiently compressed and yet preserves the visual image information of the original source image in a computer environment. A preferred embodiment of the invention removes the image data from the source image that are lost during the normal storage and halftoning stages in one step. Each pixel in the source image is compared to the threshold array values. If the value of the source image pixel is less than the corresponding threshold array pixel, then a zero is placed in that position in the dithered image array, otherwise a one is placed in the dithered image array. The dithered image array is then compared with the threshold array, thereby creating a range array where the range of each pixel is determined using the dithered image array values combined with the threshold array values. A value selection is then made from the range array to create a derived image array where one value is selected from the range that has been established for each pixel. The actual value selected depends on the desired print quality and/or compression ratio. The result is an image that is much simpler than the source image and can be compressed without any further loss of information because the amount of data known to be lost has been removed. The derived image will produce the same dithered image using the same threshold array as the original source image in the halftone process.

21 Claims, 5 Drawing Sheets

DITHERED IMAGE COMPRESSION SYSTEM

BACKGROUND OF THE INVENTION

1. Technical Field

The invention relates to the compression of digital image data in a computer environment. More particularly, the invention relates to the compression of digital image data during the dithering process in a computer environment.

2. Description of the Prior Art

Digital image rendering involves comparing an array of pixel values of a source image and a threshold array to generate a new array of pixels values, called the dithered image. The pixels in the dithered image usually has less information (bits per pixel) than the pixels in the source image.

The source image must go through several stages such as storage and halftoning before printing. The source image is normally compressed before it is stored on a computer system. This is because the raw data requires a large amount of memory. For example, an 8.5"×11" letter-sized, full color image normally takes approximately 64 MB to 70 MB of memory (on the hard disk or RAM), uncompressed. Image data are lost during the compression stages whenever a lossy compression technique, e.g., Joint Photographic Experts Group (JPEG), is used to compress the source image.

Many printing devices are not capable of reproducing gray scale images because they are bi-level. As a result, the binary representation of a gray scale image is a necessity in a wide range of applications such as laser printers, facsimile machines, lithography, liquid crystal displays, and plasma panels. Gray scale and color images are typically converted to binary images using halftone techniques. A typical example is halftoning, or dithering, an eight-bit/pixel source image to generate a one bit/pixel "bitmap" for laser printer output.

Halftone generally refers to the process of generating continuous variations of intensity on a printed page using arrays of discrete pixels whose intensity is binary. Halftoning renders the illusion of various shades of gray by using binary levels, black and white, and can be implemented either digitally (laser printers) or optically (newspaper printing).

After an image goes through the halftone process, the halftone image is compressed for storage on the computer system because of memory demands. Compressing a halftone image is usually a challenging task because the pixel values in the dithered image may appear random to a software program and a high compression ratio can be difficult to achieve.

In addition, the threshold array process is considered the major contributor to the loss of information as well as adding noise which makes compression difficult.

Halftoning, or dithering, techniques using dither matrices are described in U.S. Pat. No. 4,760,460 issued to Shimotohno on Jul. 26, 1988, which teaches a method for transmitting a halftone image using a dithering method which divides an image into a plurality of regions corresponding to the dither matrix used. Average density values are calculated to determine addresses for encoding, compression, and transmission.

Typical halftoning techniques such as using blue noise masks are described in U.S. Pat. Nos. 5,708,518 and 5,323,247 issued to Parker et al on Jan. 13, 1998, which teaches a method and system for rendering a halftone image of a gray scale image by utilizing a pixel-by-pixel comparison of the gray scale image against a blue noise mask.

Methods for compressing computer images are described in several publications. U.S. Pat. No. 5,542,031 issued to Douglass et al on Jul. 30, 1996, describes a method for processing computerized data in Postscript format through an interpreter and rasterizer utilizing parallel processing.

U.S. Pat. No. 5,522,898 issued to Deschuytere on Sep. 3, 1996, describes a method using lossy and lossless compression in a raster image processor which generates a compressed bitmap, bitmask, and contone map of an image and reconstructing said image on the fly using said bitmap, bitmask, and contone map.

U.S. Pat. No. 5,359,430 issued to Zhang on Oct. 25, 1994, describes a method for converting continuous-tone images into a first and second halftone image and error image. Scattered pixels in said error image are removed and said error image is compressed and sent to a receiver which reverses the process of creating said error image.

U.S. Pat. No. 5,457,772 issued to Shannon on Oct. 10, 1995, and U.S. Pat. No. 5,548,689 issued to Poppenga et al on Aug. 20, 1996, teach a method for converting source color image data to a rasterized monochrome bit map which involves a conversion cycle for converting source pixels to gray scale values.

However, these methods do not address the problem of image data loss during the storage and halftoning processes.

It would be advantageous to provide a dithered image compression system that limits the amount of image data lost during the storage and halftone processes, yet preserves the visual appearance of the original source image result, thus creating a more efficient image file. It would further be advantageous to provide a dithered image compression system that takes advantage of knowing the amount of data lost during the storage and halftone stages, thereby giving the user the ability to adjust to the desired image quality and compression ratio.

SUMMARY OF THE INVENTION

The invention provides a dithered image compression system. The invention converts a source image into an image that is efficiently compressed and yet preserves the visual image information of the original source image. In addition, the invention provides a system that saves time and memory space on the storage system by eliminating the intermediate compression and halftone stages that gradually decrease the source image size.

A preferred embodiment of the invention removes the image data from the source image that are lost during the normal storage and halftoning stages in one step. Each pixel in the source image is compared to the threshold array values. If the value of the source image pixel is less than the corresponding threshold array pixel, then a zero is placed in that position in the dithered image array. If the value of the source image pixel is greater than the threshold pixel, then a one is placed in the dithered image array.

The dithered image array is then compared with the threshold array. A range array is created where the range of each pixel is determined using the dithered image array values combined with the threshold array values.

A value selection is then made from the range array to create a derived image array. One value is selected from the range that has been established for each pixel. The actual value chosen depends on the desired print quality and/or compression ratio. The result is an image that is much simpler than the source image. The resulting derived array is then compressed, the derived image can be compressed using a lossy or lossless technique without any further loss of information because the amount of data known to be lost has been removed. The derived image will produce the same dithered image using the same threshold array as the original source image in the halftone process.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a dithered image compression system in a computer environment. A system according to the invention converts a source image into an image that is efficiently compressed and yet preserves the visual image information of the original source image. In addition, the invention provides a system that saves time and memory space on the storage system by eliminating the intermediate compression and halftone stages that gradually decrease the source image size.

The reason for compression technology used in printers is that anytime something is printed in color or black and white, the raw data requires a large amount of memory. For example, an 8.5"×11" letter-sized, full color image normally takes approximately 64 MB to 70 MB of memory (on the hard disk or RAM), uncompressed. The typical personal computer (PC) has 64 MB of RAM. This means that one page can be printed before the memory runs out and the user then must wait for a long period of time before the next page is rendered.

Halftoning, or dithering, is used to convert gray scale or color images to black and white space for devices such as laser printers and fax machines. The halftone process generates continuous variations of intensity on a printed page using arrays of discrete pixels whose intensity is binary. Halftoning renders the illusion of various shades of gray by using these binary levels of black and white, and can be implemented either digitally (laser printers) or optically (newspaper printing).

Figure 1:
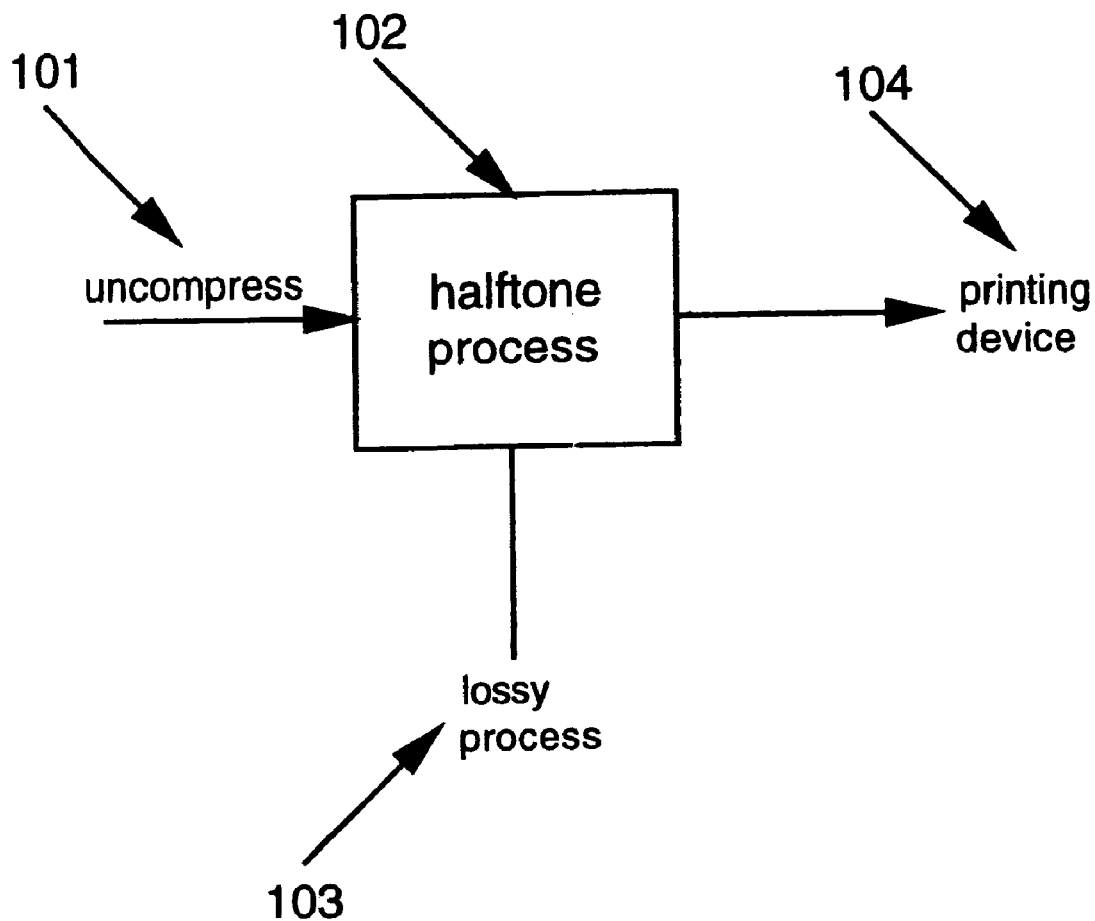
FIG. 1 is a block schematic diagram of a halftone process according to the invention.

Referring to FIG. 1, an example of a typical halftone process is shown. The uncompressed raster image 101 is sent through the halftone process 102. The halftone process 102 is usually performed for most printing devices because these devices are not capable of rendering continuous tone images. These devices can only render a binary value of zero or one, i.e., turning a-pixel on or off. For example, a halftone process converts an eight bit/pixel contone image having the values ranging between zero and 255 over to the one bit/pixel bitmap, zero to one space. The halftone process throws away information in the transformation of the continuous tone image to a discrete image while still maintaining the visual information, i.e., it is a lossy process. A new image array of pixel values is created and then a lossy compression technique 103 is performed on the new image. The compressed image is later sent to the printer 104. The image is then uncompressed before printing.

Figure 2:
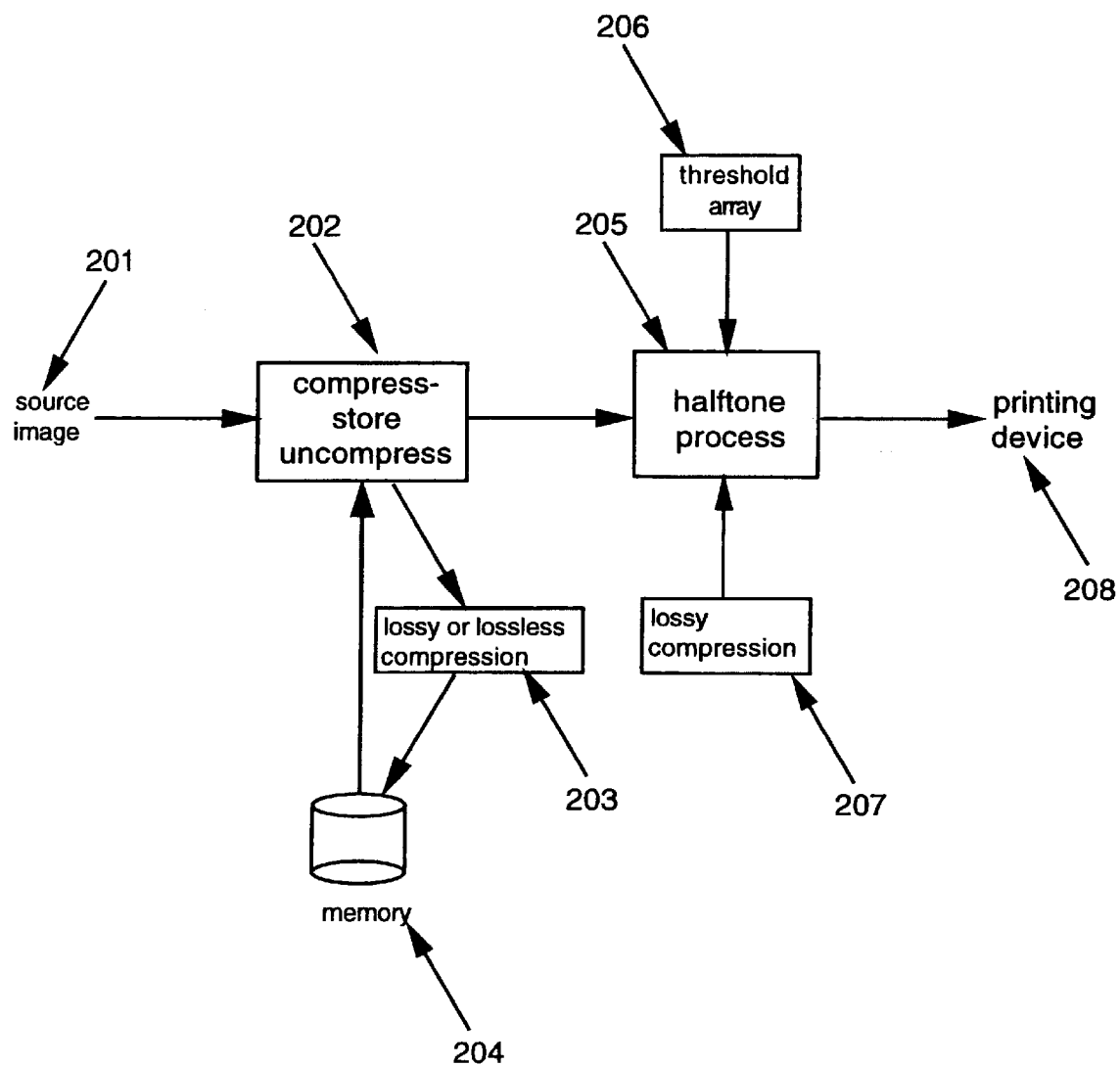
FIG. 2 is a block schematic diagram of a typical image storage/compression/halftone process according to the invention.

With respect to FIG. 2, a normal computer system stores a source image 201 as a compressed file to conserve memory space 204. The image is compressed 202 using a lossy (e.g., Joint Photographic Experts Group (JPEG)) or a lossless technique 203 and stored in system memory 204. The main disadvantage of using a lossless technique is that the resulting image is sometimes larger than the original image.

The image is stored on the system 204 until it is ready to print. The stored image is retrieved from memory 204 and uncompressed 202 before being sent to the halftone process 205 on its path to be printed. The image then goes through the halftone process 205 using the threshold array 206. The resulting image is again compressed using a lossy compression technique 207 once the halftone process 205 is complete. The compressed final image is then sent to the printer or display device for printing 208.

It is well known in the art that the lossy compression step loses some of the image information of the original image.

The problem with the normal process is that the image is put through two lossy compression steps (assuming that the lossless compression technique is not used because it expands the source image size). Image information is lost in both the compress/store process 202 and the halftone process 205.

Compressing a halftone image is usually a challenging task because the pixel values in the dithered image may appear random to a software program and a high compression ratio can be difficult to achieve. The threshold array process is also considered the major contributor to the loss of image information as well as adding noise which makes compression difficult.

A preferred embodiment of the invention combines the two lossy compression stages into one by removing the image data from the source image that are lost during the normal storage and halftoning stages in one step. Given that the threshold array is known, a new source image is constructed that meets the following objectives:

1. The new source image will produce the same dithered image using the same threshold array as the original source image.
2. By carefully choosing values in the new source image, it is easier to achieve a higher compression ratio.

It is known that a certain amount of information is lost in the two lossy compression stages. Since the information lost in the lossy compression stages is not recoverable, the image data is adjusted to maintain the image quality as well as the compression ratio. The amount of data that is lost during the two lossy steps is known ahead of time and that data is thrown away in one step, thus speeding up the printing process. This also helps the compression ratio because the data is already discarded before compressing, rather than sending the image through two compression steps and losing data at each step while the size of the image gets smaller each time.

Figure 3:
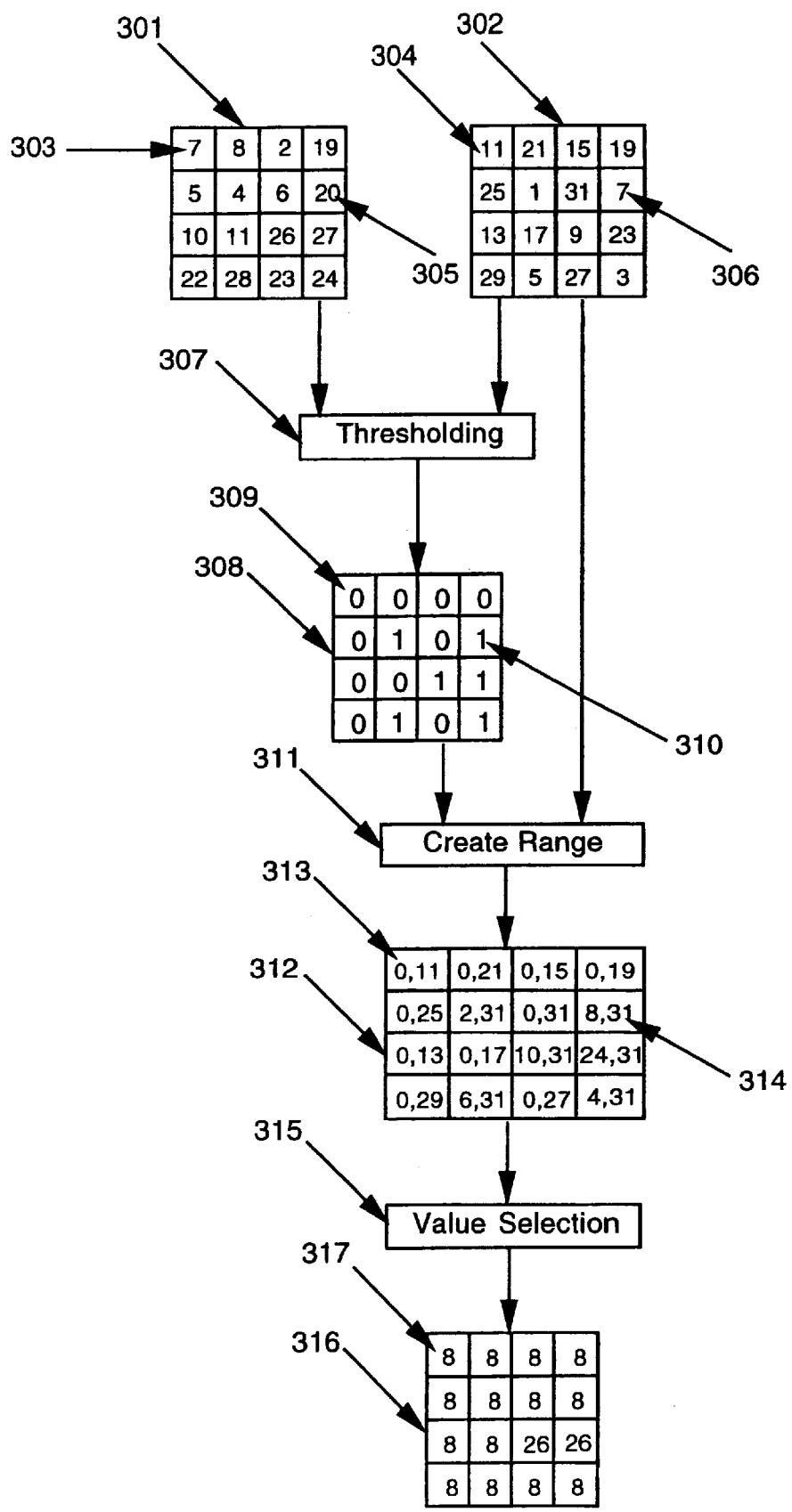
FIG. 3 is a block schematic diagram of a preferred embodiment of the invention removing known data from a source image according to the invention.

Referring to FIG. 3, the source image 301 is first compared to a threshold array 302. Each pixel in the source image 301 is compared to the threshold array values 302 in the thresholding step 307. If the value of the source image pixel is less than the corresponding threshold array pixel, then a zero is placed in that position in the dithered image array 308. If the value of the source image pixel is greater than the threshold pixel, then a one is placed in the dithered image array 308.

The dithered image array 308 is then compared with the threshold array 304. A range array 312 is created 311. The range of each pixel is determined using the dithered image array values 308 and the threshold array values 302.

Using a five-bit example, the range of the values of a pixel can be zero to 31. Here, the source pixel value is seven 303 and the corresponding threshold pixel value is 11 304. When a source pixel value is less than the threshold pixel value the corresponding pixel in the dithered image array 308 is set to zero 309. The pixel values in the dithered array 308 are then compared to the threshold array values 302. The dithered pixel has a value of zero 309 and the threshold array pixel has a value of 11 304. The pixel's range is set to zero to 11 313 in the range array 312.

In an example where the source image pixel is greater than the threshold image pixel, the source pixel here is 20 305 and the threshold pixel value is seven 306. The derived image array 308 receives a one 310 because the source image pixel value 305 is greater than the threshold pixel value 306. The range then becomes eight to 31 314. This is because the source image is greater than seven 306 and the next value, eight, is selected for the low range value and the highest possible value is the maximum of five bits which is 31.

One skilled in the art will readily appreciate that, although binary dithered arrays are specifically mentioned, the invention is easily extended to multiple-bit dithered arrays.

A value selection 315 is then made on the range array 312 to create a derived image array 316. One value is selected from the range that has been established for each pixel. The result is an image that is much simpler than the source image 301. The resulting derived array 316 is then compressed, the derived image can be compressed using a lossy or lossless technique without any further loss of information because the amount of data known to be lost has been removed. The derived image will consistently produce the same dithered image using the same threshold array as the original source image in the halftone process.

The value selection process can be an arbitrary algorithm that selects from the range array according to the image quality desired.

Figure 4:
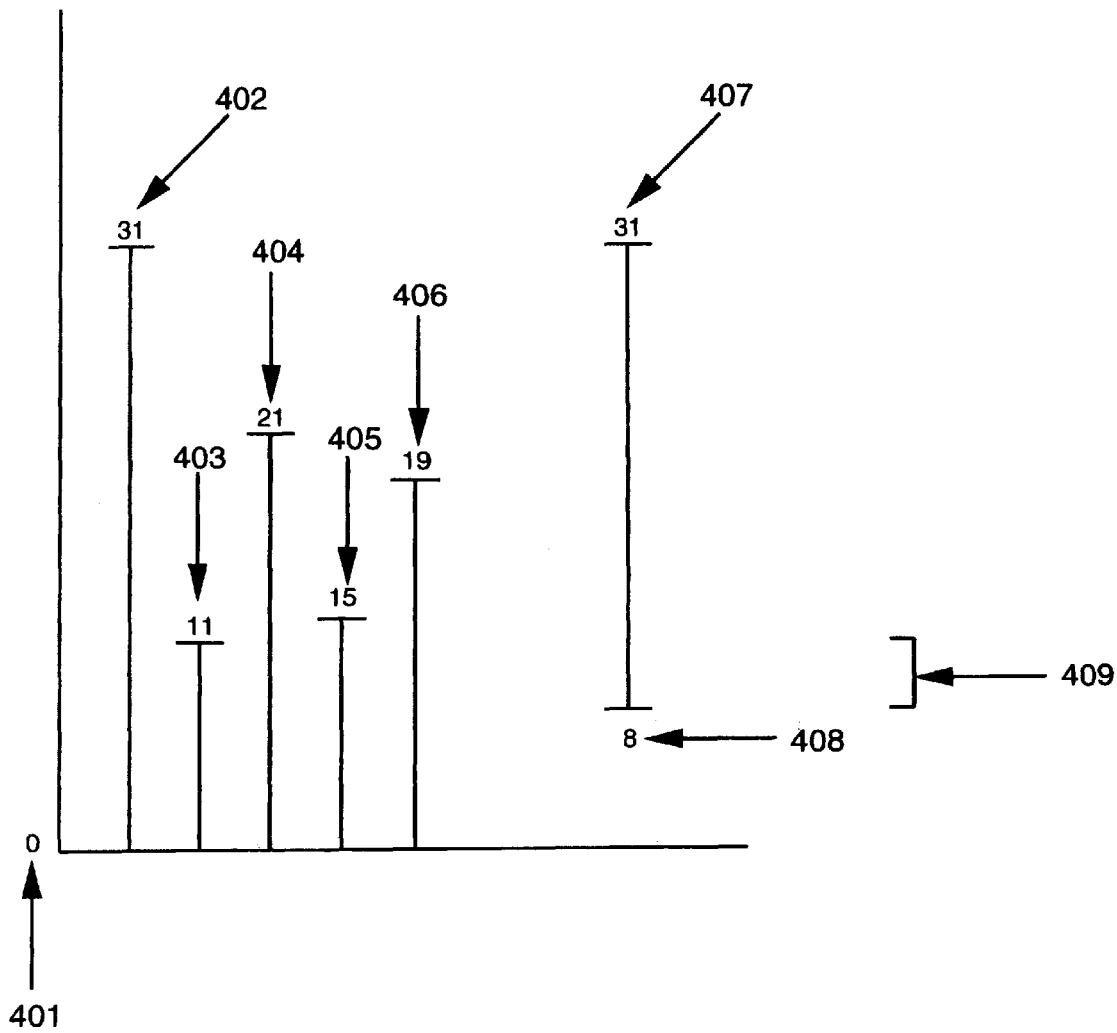
FIG. 4 is a schematic diagram of an example of a process for determining the common ranges of neighboring pixels according to the invention.

With respect to FIG. 4, one example of a selection process is shown. Looking at the ranges in an array, the values of some of the neighboring pixels have the following values:

0–31 402
0–11 403
0–21 404
0–15 405
0–19 406
8–31 407

Plotting out these values shows that these ranges have a certain subrange in common 408. The subrange 408 is eight to 11. The derived array can then take on the values of eight through 11 for these pixels. The actual value chosen depends on the desired print quality and/or compression ratio.

If a pixel occurs that is a stray, that is, it is beyond the range of the neighboring pixels, then that pixel value is selected arbitrarily between its specified range in the range array.

The derived image, or new source image, satisfies the two conditions mentioned above. Although it may not look more compressible than the dithered image in this particular example, it does have the following advantages on a larger (16×16 or larger) scale:

1. There are multiple choices for the new source image. The values in the new source image can be adjusted to achieve better compression as long as the dithered image does not change.
2. The complexity of the new source image is independent of the threshold array, which tends to introduce noise that is hard to compress.
3. The new source image can be compressed by either a run-length type, JPEG, or a mixture of compression algorithms.

A pseudo-code example of another preferred embodiment of the invention follows:

for each pixel in Src [i, j]{
  find Thd [i, j];
  find D [i, j] by comparing Src [i, j ] to Thd [i, j];
  compare D [i, j] to Thd [i, j], find Range_low [i, j] and Range_high [i, j] such that for each value v, Range_low [i, j]<=v<=Range_high [i, j ], if Src [i, j] is replaced with v, we still get the same D [i, j] if the new Src [i, j] is compared to Thd [i, j];
}
Now each pixel is associated with a range (Range_low [i, j], Range_high [i, j]);
for each pixel position i, j select one value N [i,j]
  where Range_low [i, j]<=N[i, j]<=Range_high [i, j];
such that the following condition is met whatever possible:
  N [i, j]==N [i+1, j];
  N [i, j]==N [i, j+1];
This means that we are trying to force neighboring values in array N into having the same values;
Now the source image Src [i, j] can be replaced by N [i, j] and still produce the same dithered image D [i, j];
Apply compression to N [i, j].
Where:
  Src [i, j]=source image.
  P Thd [i, j]=threshold value array.
  D [i, j]=dithered image array.
  Range_low [i, j], Range_high [i, j]=pairs of integers associated with each pixel in Src.
  N [i, j]=derived image array.

Figure 5:
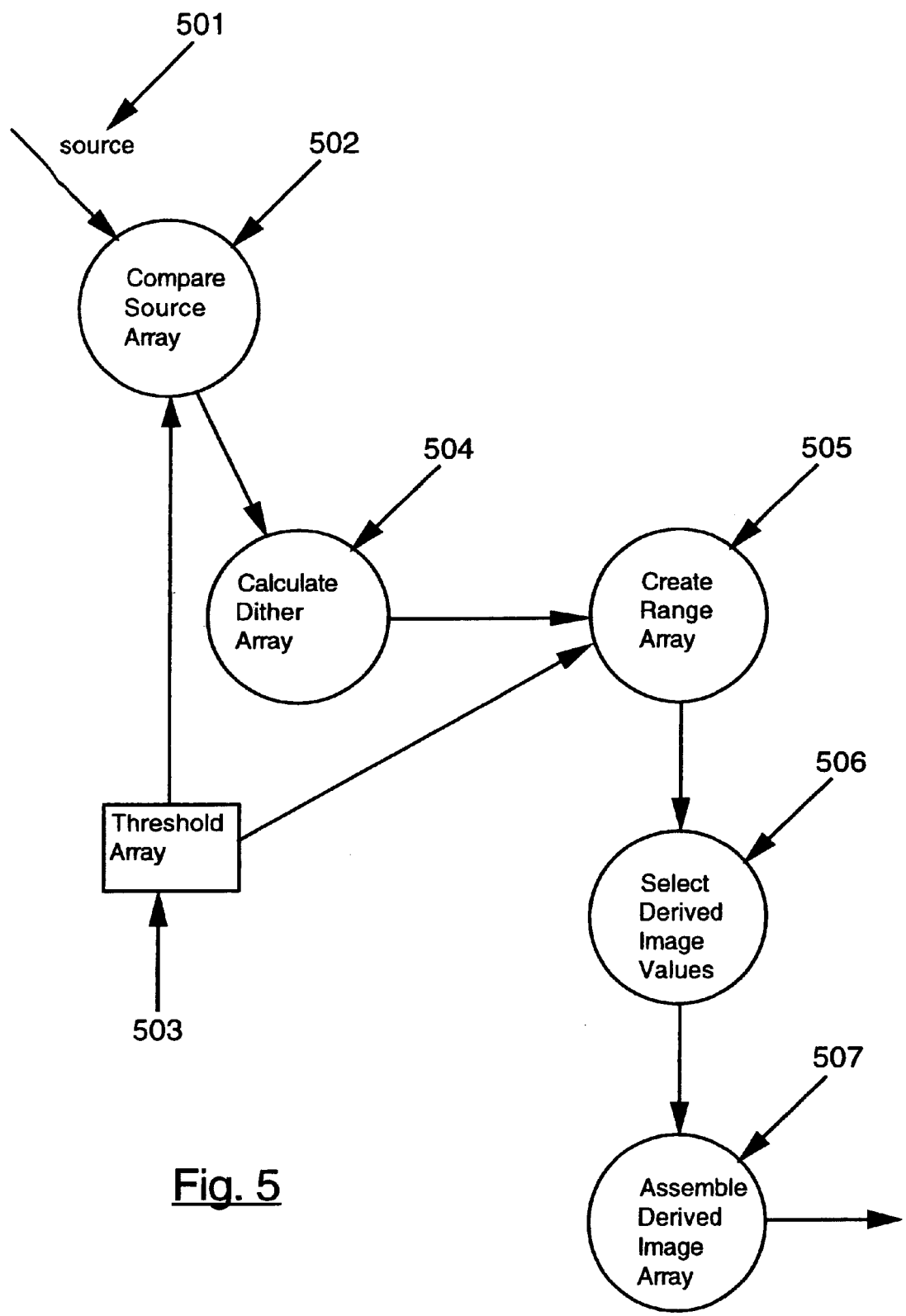
FIG. 5 is a block schematic diagram of a task-oriented view of a preferred embodiment of the invention according to the invention.

Referring to FIG. 5, a task-oriented view of a preferred embodiment of the invention is shown. The source image 501 is input into the Compare Source Array task 502. The Compare Source Array task 502 compares the source image 501 with the Threshold Array 503. Each pixel in the source image 501 is compared to each corresponding pixel in the Threshold Array 503. A dithered image array is created in the Calculate Dithered Array task 504.

The Create Range Array task 505 compares the dithered array with the Threshold Array 503. It creates a range array based on the values from the two arrays. The values selected for the range array are processed by the Select Derived Image Values task 506. The Select Derived Image Values task 506 determines the appropriate value for each pixel that are within the range array values which meet the desired quality and compression levels. The Assemble Derived Image Array task 507 assembles the derived image array and sends the array out for compression and storage. The derived image array retains the visual appearance of the source image.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for converting and storing halftone or dithered images which limits the amount of image data lost and optimizes the compression ratio of said image in a computer environment, comprising the steps of:

comparing each pixel value in a source image to corresponding pixels in a threshold array;

creating a dithered image array;

wherein a zero is placed in the corresponding location of said dithered image array if the value of the source image pixel is less than or equal to the value of the corresponding threshold array pixel;

wherein a one is placed in the corresponding location of said dithered image array if the value of the source image pixel is greater than the value of the corresponding threshold array pixel;

calculating a range array; and wherein the range of each pixel in said range array is determined using the corresponding values of said threshold array and said dithered array.

2. The process of claim 1, wherein said calculating step determines the low value of said range by setting said low value to the minimum bit/pixel value if the pixel value in said dithered array is set to zero, otherwise setting said low value to the corresponding threshold array pixel value+one, if the dithered pixel value is set to one.

3. The process of claim 1, wherein said calculating step determines the high value of said range by setting said high value to the corresponding threshold array pixel value if the pixel value in said dithered array is set to zero, otherwise setting said high value to the maximum bit/pixel value if the dithered pixel value is set to one.

4. The process of claim 1, further comprising the step of:

creating a derived image array; and wherein the pixel value of said derived image array is set to a value within the range of the corresponding location in said range array such that the desired image quality and/or compression ratio are obtained.

5. The process of claim 4, further comprising the step of:

compressing said derived image array.

6. The process of claim 1, wherein said calculating step determines the low value of said range by setting said low value to a value that is greater than or equal to the minimum bit/pixel value if the pixel value in said dithered array is set to zero, otherwise by setting said low value to a value that is greater than the corresponding threshold array pixel value if the pixel value in said dithered array is set to one, said low value is determined such that when said low value is used, it will result in the same dithered array value as said source image.

7. The process of claim 1, wherein said calculating step determines the high value of said range by setting said high value to a value. that is less than or equal to the corresponding threshold array value if the pixel value in said dithered array is set to zero, otherwise by setting said high value to a value that is less than or equal to the maximum bit/pixel pixel value if the pixel value in said dithered array is set to one, said high value is determined such that when said high value is used, it will result in the same dithered array value as said source image.

8. An apparatus for converting and storing halftone or dithered images which limits the amount of image data lost and optimizes the compression ratio of said image in a computer environment, comprising:

a module for comparing each pixel value in a source image to corresponding pixels in a threshold array;

a module for creating a dithered image array;

wherein a zero is placed in the corresponding location of said dithered image array if the value of the source image pixel is less than or equal to the value of the corresponding threshold array pixel;

wherein a one is placed in the corresponding location of said dithered image array if the value of the source image pixel is greater than the value of the corresponding threshold array pixel;

a module for calculating a range array; and wherein the range of each pixel in said range array is determined using the corresponding values of said threshold array and said dithered array.

9. The apparatus of claim 8, wherein said calculating module determines the low value of said range by setting said low value to the minimum bit/pixel value if the pixel value in said dithered array is set to zero, otherwise setting said low value to the corresponding threshold array pixel value+one, if the dithered pixel value is set to one.

10. The apparatus of claim 8, wherein said calculating module determines the high value of said range by setting said high value to the corresponding threshold array pixel value if the pixel value in said dithered array is set to zero, otherwise setting said high value to the maximum bit/pixel value if the dithered pixel value is set to one.

11. The apparatus of claim 8, further comprising:

a module for creating a derived image array; and wherein the pixel value of said derived image array is set to a value within the range of the corresponding location in said range array such that the desired image quality and/or compression ratio are obtained.

12. The apparatus of claim 11, further comprising the step of:

compressing said derived image array.

13. The apparatus of claim 8, wherein said calculating module determines the low value of said range by setting said low value to a value that is greater than or equal to the minimum bit/pixel value if the pixel value in said dithered array is set to zero, otherwise by setting said low value to a value that is greater than the corresponding threshold array pixel value if the pixel value in said-dithered array is set to one, said low value is determined such that when said low value is used, it will result in the same dithered array value as said source image.

14. The apparatus of claim 8, wherein said calculating module determines the high value of said range by setting said high value to a value that is less than or equal to the corresponding threshold array value if the pixel value in said dithered array is set to zero, otherwise by setting said high value to a value that is less than or equal to the maximum bit/pixel pixel value if the pixel value in said dithered array is set to one, said high value is determined such that when said high value is used, it will result in the same dithered array value as said source image.

15. A program storage medium readable by a computer, tangibly embodying a program of instructions executable by the computer to perform method steps for converting and storing halftone or dithered images which limits the amount of image data lost and optimizes the compression ratio of said image in a computer environment, comprising the steps of:

comparing each pixel value in a source image to corresponding pixels in a threshold array;

creating a dithered image array;

wherein a zero is placed in the corresponding location of said dithered image array if the value of the source image pixel is less than or equal to the value of the corresponding threshold array pixel;

wherein a one is placed in the corresponding location of said dithered image array if the value of the source image pixel is greater than the value of the corresponding threshold array pixel;

calculating a range array; and wherein the range of each pixel in said range array is determined using the corresponding values of said threshold array and said dithered array.

16. The method of claim 15, wherein said calculating step determines the low value of said range by setting said low value to the minimum bit/pixel value if the pixel value in said dithered array is set to zero, otherwise setting said low value to the corresponding threshold array pixel value+one, if the dithered pixel value is set to one.

17. The method of claim 15, wherein said calculating step determines the high value of said range by setting said high value to the corresponding threshold array pixel value if the pixel value in said dithered array is set to zero, otherwise setting said high value to the maximum bit/pixel value if the dithered pixel value is set to one.

18. The method of claim 15, further comprising the step of:

creating a derived image array; and wherein the pixel value of said derived image array is set to a value within the range of the corresponding location in said range array such that the desired image quality and/or compression ratio are obtained.

19. The method of claim 18, further comprising the step of:

compressing said derived image array.

20. The method of claim 15, wherein said calculating step determines the low value of said range by setting said low value to a value that is greater than or equal to the minimum bit/pixel value if the pixel value in said dithered array is set to zero, otherwise by setting said low value to a value that is greater than the corresponding threshold array pixel value if the pixel value in said dithered array is set to one, said low value is determined such that when said low value is used, it will result in the same dithered array value as said source image.

21. The method of claim 15, wherein said calculating step determines the high value of said range by setting said high value to a value that is less than or equal to the corresponding threshold array value if the pixel value in said dithered array is set to zero, otherwise by setting said high value to a value that is less than or equal to the maximum bit/pixel pixel value if the pixel value in said dithered array is set to one, said high value is determined such that when said high value is used, it will result in the same dithered array value as said source image.

* * * * *